No. 695,180. Patented Mar. 11, 1902.
G. C. STONE.
APPARATUS FOR COOLING AND ABSORBING SULFURIC ANHYDRID.
(Application filed Aug. 23, 1900.)
(No Model.)

Witnesses:
D. W. Edelin
M. B. Cole

Inventor:
George C. Stone,
by Pennie & Goldsborough,
Attorneys.

UNITED STATES PATENT OFFICE.

GEORGE C. STONE, OF JERSEY CITY, NEW JERSEY, ASSIGNOR TO THE NEW JERSEY ZINC COMPANY, A CORPORATION OF NEW JERSEY.

APPARATUS FOR COOLING AND ABSORBING SULFURIC ANHYDRID.

SPECIFICATION forming part of Letters Patent No. 695,180, dated March 11, 1902.

Application filed August 23, 1900. Serial No. 27,852. (No model.)

*To all whom it may concern:*

Be it known that I, GEORGE C. STONE, a citizen of the United States, residing at Jersey City, county of Hudson, State of New Jersey, have invented certain new and useful Improvements in Coolers and Absorbers for Sulfuric Anhydrid; and I do hereby declare the following to be a full, clear, and exact description of the invention, such as will enable others skilled in the art to which it appertains to make and use the same.

My invention relates to certain new and useful improvements in coolers and absorbers designed especially for use in the cooling and absorbing of sulfuric anhydrid resulting from the union of sulfurous anhydrid and oxygen by means of the catalytic or contact process.

Figure 1:
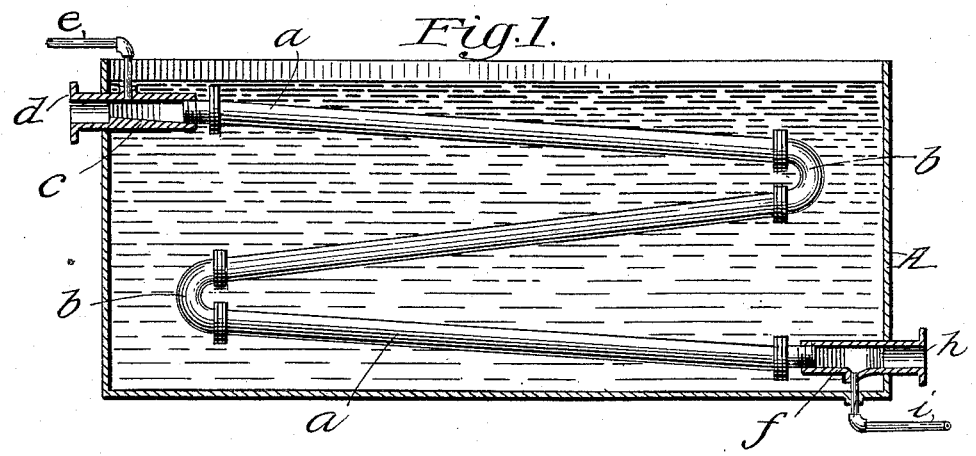
Figure 2:
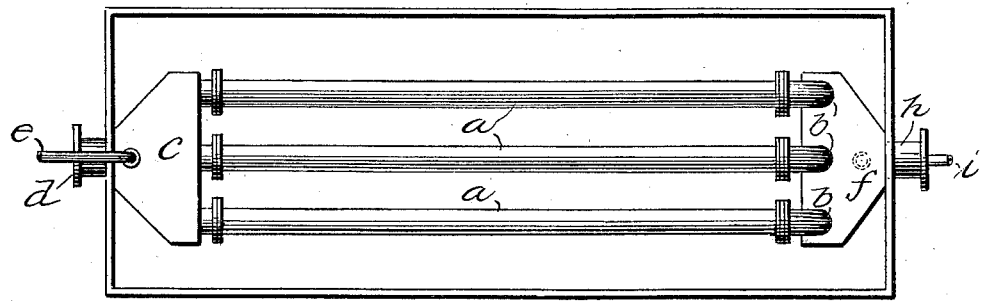
Figure 3:
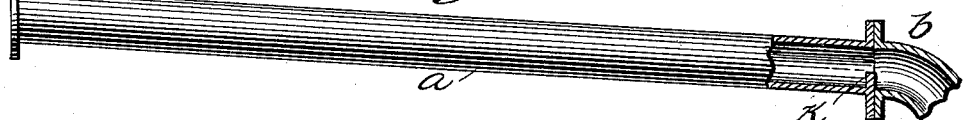
Figure 4:
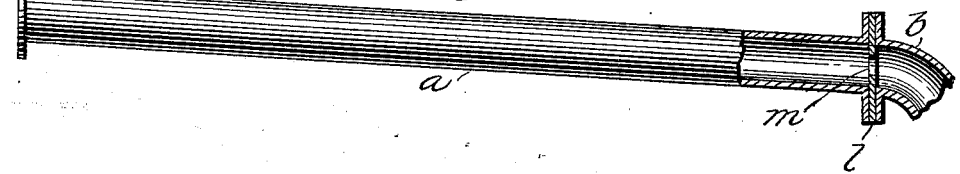

In the accompanying drawings, Figure 1 represents, partly in section and partly in elevation, a form of apparatus embodying my improvements. Fig. 2 represents a plan view thereof; and Figs. 3 and 4 represent, partly in elevation and partly in section and on a somewhat larger scale, alternative forms or modifications of the cooler-tubes, illustrating particularly means for damming the absorbing liquid on its passage through the cooler.

Similar letters of reference indicate similar parts throughout the several views.

Referring to the drawings, $a$ indicates a number of pipe-sections inclined with respect to each other and joined by U-shaped intermediate connections $b$. At their upper ends the series of pipes $a$ are connected by a manifold $c$, having an exit-nipple $d$ for the exit of any gases not absorbed in the cooling-pipes. A pipe $e$ for the admission of a current of water or weak acid enters the manifold $c$, said liquid passing downwardly through the system of pipes A. At the lower ends of the series of pipes $a$ is located a second manifold $f$, having a nipple $h$ for the inlet of the gases to be cooled and absorbed in the apparatus. A pipe $i$ serves to carry off the liquid, with its absorbed volume of sulfuric anhydrid, as it drains downwardly through the pipe system. In order to detain the absorbing liquid for a greater length of time in contact with the gas, I preferably provide each pipe-section with a dam extending transversely across its lower end. As illustrated in Fig. 3, this dam may consist of a partition $k$, which may conveniently be cast integral with the pipe, or, as illustrated in Fig. 4, the dam may consist of a disk $l$, held between adjacent pipe-flanges and having an aperture $m$ for the passage of the absorbing liquid.

The operation of the apparatus will be apparent. The gases containing sulfuric anhydrid from the contact vessels or retorts enter the manifold $f$ at the nipple $h$, and on their passage upward through the series of inclined pipes $a$ pass over a counter-current of water, weak acid, or other absorbing liquid. The temperature of the pipes $a$ is maintained at the desired low degree by immersing in a tank A, containing a cooling liquid, or by spraying the pipes with a cooling liquid, or otherwise, as may be preferred. On its passage through the series of pipes the sulfuric anhydrid is therefore cooled and is absorbed by the liquid passing through the pipes, any uncondensable or uncondensed gases finally passing out through the exit-nipple $d$.

Having thus described my invention, what I claim is—

1. A cooler and absorber for sulfuric anhydrid, comprising a system of cooling-pipes consisting of lines of oppositely-extending inclined piping formed by return-bends into a continuous closed conduit, said system having a gas-inlet and a liquid-outlet at one end, and a gas-outlet and a liquid-inlet at the other, said pipes having dams anterior to the bends.

2. A cooler and absorber for sulfuric anhydrid, comprising a system of cooling-pipes consisting of lines of oppositely-extending piping formed by return-bends into a continuous closed conduit, said system having a gas-inlet and a liquid-outlet at one end, and a gas-outlet and a liquid-inlet at the other, said pipes also having dams at the return-bends.

3. A cooler and absorber for sulfuric anhydrid, comprising a system of cooling-pipes, having a gas inlet and outlet, an inlet for the supply of absorbing liquid to the system, and an outlet for the recovery of the liquid after absorption, and dams in the cooling-pipes to correspondingly detain the liquid therein, said dams extending transversely at the lower ends of the pipe-sections, and consisting of disks inserted between the pipe-sections and having apertures of less size than the diameter of the pipe; substantially as described.

4. A cooler and absorber for sulfuric anhydrid, comprising a system of oppositely-extending pipes formed by return-bends into a continuous series of closed piping, means for externally cooling the walls of the pipes, and means for introducing a current of absorbing liquid into the pipes in opposition to the current of gas therethrough, said pipes being provided with transverse dams, located at the bends between adjacent pipes; substantially as described.

In testimony whereof I affix my signature in presence of two witnesses.

GEORGE C. STONE.

Witnesses:
H. G. CLOPPER,
C. W. SEXTON.